(12) United States Patent
Kang et al.

(10) Patent No.: US 9,422,381 B2
(45) Date of Patent: Aug. 23, 2016

(54) OLEFIN POLYMERIZATION METHOD

(71) Applicant: DAELIM INDUSTRIAL CO., LTD., Seoul (KR)

(72) Inventors: Sung Woo Kang, Daejeon (KR); Byung Soon Chun, Daejeon (KR); Young Jae Jun, Daejeon (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 0 days.

(21) Appl. No.: 14/772,466

(22) PCT Filed: Mar. 7, 2014

(86) PCT No.: PCT/KR2014/001872
§ 371 (c)(1),
(2) Date: Sep. 3, 2015

(87) PCT Pub. No.: WO2014/137177
PCT Pub. Date: Sep. 12, 2014

(65) Prior Publication Data
US 2016/0002376 A1  Jan. 7, 2016

(30) Foreign Application Priority Data

Mar. 7, 2013  (KR) ........................ 10-2013-0024330

(51) Int. Cl.
*C08F 2/34* (2006.01)
*C08F 2/01* (2006.01)
(Continued)

(52) U.S. Cl.
CPC ................. *C08F 210/16* (2013.01); *C08F 2/34* (2013.01); *C08F 110/02* (2013.01); *Y02P 20/582* (2015.11)

(58) Field of Classification Search
CPC .............. C08F 2/01; C08F 2/34; B01J 19/24; B01J 8/24; B01J 19/248
USPC ..................................................... 526/88, 918
See application file for complete search history.

(56) References Cited

U.S. PATENT DOCUMENTS 3,984,387 A   10/1976  Liu et al.
4,003,712 A   1/1977   Miller
(Continued)

FOREIGN PATENT DOCUMENTS

EP   0301872 A1   7/1989
EP   0475603 A1   8/1990
(Continued)

OTHER PUBLICATIONS

Form PCT/ISA/237 of counterpart international application PCT/KR2014/001872, mailed May 28, 2014, and english translation thereof.

*Primary Examiner* — Fred M Teskin
(74) *Attorney, Agent, or Firm* — Nath, Goldberg & Meyer; Jerald L. Meyer; Tanya E. Harkins

(57) ABSTRACT

A method of olefin polymerization enables production of polyolefin with high productivity while suppressing sheeting or caking in the reactor. The method of olefin polymerization includes: feeding a circulating gas including at least one alpha-olefin and an inert gas into a reactor; polymerizing the alpha-olefin into a polyolefin in a reaction region in the reactor; and discharging the polyolefin from the reactor, which reactor consists of a cylindrical base section a positioned in the lower part thereof and a conical top section b positioned on the top of the cylindrical base section and having an open top. The inside of the reactor is divided into a reaction region A that is a fluidized bed region having an olefin polymerization occurring therein, and a free region B positioned on the top of the reaction region A and having solid polyolefin particles separated from the gas phase.

7 Claims, 2 Drawing Sheets

(51) Int. Cl.
  *B01J 8/24* (2006.01)
  *C08F 210/16* (2006.01)
  *B01J 19/24* (2006.01)
  *C08F 110/02* (2006.01)

(56) References Cited

U.S. PATENT DOCUMENTS

| | | |
|---|---|---|
| 4,551,509 A | 11/1985 | Takayuki et al. |
| 4,650,841 A | 3/1987 | Levresse et al. |
| 4,956,427 A | 9/1990 | Jenkins, III et al. |
| 5,428,118 A | 6/1995 | Painter et al. |
| 5,473,028 A | 12/1995 | Nowlin et al. |
| 5,773,988 A | 6/1998 | Sayre et al. |
| 5,804,678 A | 9/1998 | Morita et al. |
| 6,441,108 B1 * | 8/2002 | Haendeler ............ B01J 8/1872 422/132 |
| 8,128,878 B2 * | 3/2012 | Kang ................... B01J 8/1827 422/139 |

FOREIGN PATENT DOCUMENTS

| | | |
|---|---|---|
| EP | 0728771 A1 | 8/1996 |
| KR | 10-2001-0031015 A | 4/2001 |
| KR | 10-0492348 B1 | 9/2005 |
| KR | 10-0981612 B1 | 9/2010 |
| KR | 10-0999543 B1 | 12/2011 |
| WO | 96/04322 A1 | 2/1996 |

* cited by examiner

OLEFIN POLYMERIZATION METHOD

This is a National Phase Application filed under 35 U.S.C. 371 as a national stage of PCT/KR2014/001872, filed Mar. 7, 2014, an application claiming the benefit of Korean Patent Application No. 10-2013-0024330, filed Mar. 7, 2013, the content of each of which is hereby incorporated by reference in its entirety.

TECHNICAL FIELD

The present invention relates to a method of olefin polymerization, and more particularly to a method of olefin polymerization that enables production of polyolefin with high productivity while suppressing sheeting or caking in the reactor.

BACKGROUND ART

The gas-phase olefin polymerization method using a fluidized bed has long been applied for commercial use. FIG. 1 is a schematic diagram showing a conventional fluidized bed reactor for use in a polymerization reaction in which polymerization of olefin is carried out. As illustrated in FIG. 1, the fluidized bed reactor 10 is divided into a reaction region A in which a polymerization reaction of olefin takes place, and a free region B positioned on the top of the reaction region A and having most of the solid polymer particles separated from the gas phase. In the reactor 10, the reaction region A is confined to a vertical cylinder section a. To maintain the fluidized bed of polyolefin produced in the reaction region A, a reactive gas stream is continuously fed into an inlet 11 formed in the bottom portion of the reactor 10. The unreacted monomers of the reactive gas stream exhaust through an outlet 13 positioned on the top portion of the reactor 10. Separated from the released reactive gas stream and cooled down, the residual particles are fed back to the lower part of the polymer layer through the inlet 11 in the bottom portion of the reactor 10. The polymer (i.e., the product) formed in the reactor 10 is continuously removed from the fluidized bed. In FIG. 1, the reference numeral 14 designates an inlet for feeding catalyst particles or a pre-polymer and the reference numeral 12 designates a gas distributor.

FIG. 2 is a schematic diagram showing another type of the fluidized bed reactor for use in a polymerization reaction in which a polymerization reaction of olefin occurs. The polymerization reactor illustrated in FIG. 2 is an internally circulating fluidized bed reactor 10 that is equipped with a draft tube 20 in a fluidized bed A to circulate solid (polyolefin) particles. The draft tube 20 partitions the internally circulating fluidized bed reactor 10 into two polymerization regions. The inside of the draft tube 20 forms a riser region in which the growing polyolefin moves upward under the fast fluidizing conditions, and the outside of the draft tube 20 becomes an annulus region in which the polyolefin after passing through the riser region moves downward with gravity. Passing through the annulus region, the polyolefin goes back to the lower part of the riser region. In this manner, the polyolefin is circulated to undergo the polymerization reaction while moving between the riser and annulus regions. As shown in FIGS. 1 and 2, the general fluidized bed polymerization reactor as used in a polymerization of olefin consists of a cylindrical base section "a" forming the reaction region A and a conical top section forming the free region B.

In the fluidized bed reactor 10 for use in a gas phase polymerization of olefin, it is necessary to prevent agglomeration of the product such as sheeting or caking (i.e., reactor contamination) on the wall or other parts of the reactor 10. There have been suggested different methods for the solutions to this problem. For example, U.S. Pat. No. 4,956,427 discloses a method of hardening aminosilicone through hydrolysis to coat the inner surface of the gas phase polymerization reactor, which method disadvantageously requires a long-term cessation of operation and takes high cost to apply a coating on the inside of the reactor. U.S. Pat. No. 3,984,387 describes a method of preventing the formation of locally overheated polymer particles by injecting an inert gas, such as nitrogen, helium, etc., together with a monomer gas into the polymerization reactor. This method may reduce the partial pressure of the monomers in the reactor but deteriorate the catalytic activity. In addition, U.S. Pat. Nos. 4,650,841 and 4,551,509 disclose a method of preventing fouling by using a deactivating agent to reduce the catalytic activity. U.S. Pat. No. 5,733,988 specifies the use of an alcohol-, ammonia-, or sulfur-containing material as an anti-fouling agent. U.S. Pat. No. 5,804,678 describes a method of preventing fouling by adding water, alcohol, or ketone. However, these methods are to deteriorate the catalytic activity for the sake of preventing agglomeration of particles, only to decrease the reactivity. U.S. Pat. No. 5,473,028 discloses a method of preventing fouling without reducing the catalytic activity by adding a supported alumoxane or a solid alumoxane into the reactor, which method involves an economical difficulty for commercial use because the alumoxane is very expensive.

On the other hand, many attempts have been made to solve the problem in association with the agglomeration of the products by improving the design of the reactor. For example, U.S. Pat. No. 4,003,712 discloses a vertical fluidized bed reactor having a cylindrical base section extending to a short conical section and an additional cylindrical base section with a cross section greater than that of the said cylindrical base section. The polymerization reaction occurs in the lower portion of the reactor, while the polymer particles are separated from the gas stream in the top portion of the reactor that forms a stable region. Further, WO 96/04322, EP 0301 872, EP 0 475 603, and EP 728 771 make an attempt to solve the problem regarding the agglomeration of the product based on the geometry of the reactor. Unfortunately, the reactors disclosed in those patents are susceptible to the caking of polymer particles in the transition region between the base and top sections, so a continuously reduced cross section is formed to cause a cessation of the polymerization reaction, which presents a need for washing the reactors. Further, U.S. Pat. No. 5,428,118 discloses a method of suppressing the sheeting or caking of the product or eliminating the caking particles by feeding an air stream in the tangential direction along the wall of the free region. This makes the structure of the reactor too complicated. The common feature of the above-specified methods is that the fluidized bed A is located in the cylindrical section "a" of the reactor.

DISCLOSURE OF INVENTION

It is therefore an object of the present invention to provide a method of olefin polymerization that solves the above-mentioned problems with the prior art.

It is another object of the present invention to provide a method of olefin polymerization that enables polymerization of polyolefin with high productivity while suppressing the sheeting or caking in the reactor.

To achieve the objects of the present invention, there is provided a method of olefin polymerization including: feeding a circulating gas including at least one alpha-olefin and an inert gas into a reactor; polymerizing the alpha-olefin into a polyolefin in a reaction region in the reactor; and discharging the polyolefin from the reactor, which reactor includes a cylindrical base section a positioned in the lower part thereof and a conical top section b positioned on the top of the cylindrical base section and having an open top. The conical top section b has an angle of inclination in the range of 4° to 7° with respect to a perpendicular line. The inside of the reactor is divided into a reaction region A that is a fluidized bed region having an olefin polymerization occurring therein, and a free region B positioned on the top of the reaction region A and having solid polyolefin particles separated from the gas phase. The fluidized bed is at least as high as the cylindrical base section a and 80 percent or less the height of the conical top section b.

EFFECTS OF THE INVENTION

The method of olefin polymerization according to the present invention enables a polymerization of polyolefin with high productivity while suppressing the sheeting or caking phenomenon that is common in the fluidized bed polymerization reaction.

BEST MODES FOR CARRYING OUT THE INVENTION

Figure 1:
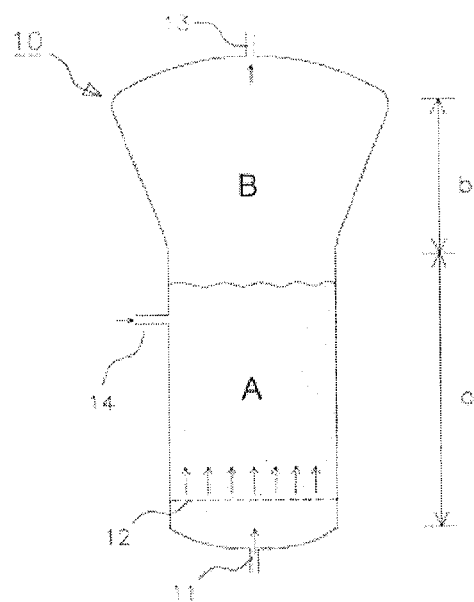
FIG. 1 is a schematic diagram showing a conventional fluidized bed polymerization reactor for use in a polymerization of olefin.
Figure 2:
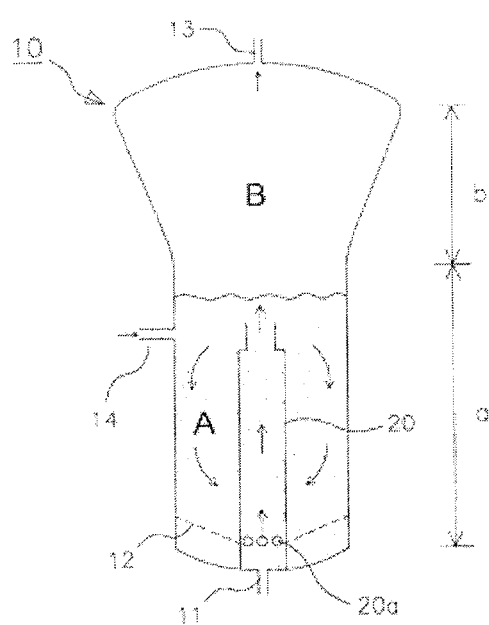
FIG. 2 is a schematic diagram showing another conventional fluidized bed polymerization reactor for use in a polymerization of olefin.

Hereinafter, a detailed description will be given as to the present invention with reference to the accompanying drawings. The same reference numerals designate the components of the same or similar functions. The method of olefin polymerization according to the present invention includes: feeding a circulating gas including at least one alpha-olefin and an inert gas into a reactor; polymerizing the alpha-olefin into a polyolefin in a reaction region in the reactor; and discharging the polyolefin from the reactor.

Figure 3:
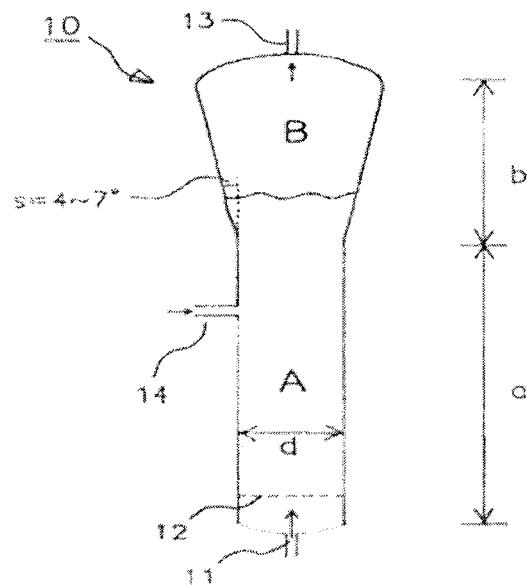
FIG. 3 is a diagram showing an example of the fluidized bed polymerization reactor capable of using the method of olefin polymerization according to the present invention.

FIG. 3 is a diagram showing an example of the fluidized bed polymerization reactor capable of using the method of olefin polymerization according to the present invention. As illustrated in FIG. 3, the reactor 10 capable of using the method of olefin polymerization according to the present invention is comprised of: (i) a cylindrical base section "a" positioned in the lower part of the reactor 10 and (ii) a conical top section "b" positioned on the top of the cylindrical base section a and having an open top. Further, the inside of the reactor 10 is divided into a reaction region A that is a fluidized bed region in which an olefin polymerization occurs, and a free region B positioned on the top of the reaction region A and having solid polyolefin particles separated from the gas phase. In the same manner of the conventional reactor, an inlet 11 is provided in the bottom portion of the reactor 10 so that a circulating gas (i.e., a reactive gas) including alpha-olefin and an inert gas is continuously fed into the reactor 10 through the inlet 11; an outlet 13 is provided in the top portion of the reactor 10 to discharge the unreacted circulating gas from the reactor 10; and a catalyst or pre-polymer inlet 14 is provided in the lateral side portion of the reactor 10 to feed a catalyst and/or a pre-polymer into the reactor. Under necessity, a gas distributor 12 may be further provided in the reactor 10 to distribute the circulating gas. The polymer (i.e., the product) formed in the reactor 10 is continuously removed from the fluidized bed A through a polyolefin outlet (not shown).

In the method of olefin polymerization according to the present invention, the fluidized bed A in which a polymerization reaction occurs is formed to extend to the conical top section b. In other words, the top of the fluidized bed A is formed on the conical top section b. In consideration of the transport disengagement height (TDH), the top of the fluidized bed A is positioned such that the fluidized bed A is at least as high as the cylindrical base section a and 80 percent or less the height of the conical top section b. Preferably, fluidized bed A (from the bottom) is 5 to 50 percent the height of the conical top section b. More preferably, the fluidized bed A is 10 to 30 percent the height of the conical top section b. In this regard, the concentration of the particles decreases from the fluidized bed A to the top portion of the reactor, and the TDH means the height where there is no drop of the particle concentration any more. When the fluidized bed A is too high, the circulating gas and the polyolefin particles are mixed together at a gas linear velocity considerably lower than the gas linear velocity at the cylindrical base section a, so the reactor is susceptible to contamination caused by the sheeting phenomenon. When the fluidized bed A is too low, the sheeting and caking phenomena are ready to occur in the inclined part of the conical top section b, possibly causing contamination of the reactor 10.

In the hydrodynamical aspect, it is necessary to control the velocity of the gas flow in the polymerization region, that is, the reaction region A so as to effectively eliminate the heat of reaction and prevent the formation of fine particles caused by inter-particle friction. The operation has to be performed at the minimum fluidization velocity or above in order to effectively eliminate the heat of reaction. As well known in the art, the operation is impossible to perform at the velocity of moving fluid above the critical suspension conditions of particles and under the excessive inter-particle friction. It is therefore required to adequately control the relation between the minimum fluidization velocity and the terminal velocity, eliminate the heat of reaction, and suppress the formation of fine particles. The minimum fluidization velocity of a particle can be calculated according to the following Equation 1 (Ergen Equation, 1955) or Equation 2 (Wen and Yu Equation, 1966):

$$U_{mf} = \frac{\mu}{\rho_p d_p} \sqrt{33.7^2 + 0.048 Ar} - 33.7 \quad \text{[Equation 1]}$$

In the Equation 1, $U_{mf}$ is the minimum fluidization velocity (m/s); Ar is Archimedean constant; $\mu$ is the viscosity (cP) of the gas; $d_p$ is the diameter (m) of the particle; and $\rho_p$ is the density (g/cc) of the particle.

$$\frac{1.75}{\varepsilon_{mf}^3 \phi_s} \left( \frac{d_p U_{mf} \rho_g}{\mu} \right)^2 + \frac{1.50(1 - \varepsilon_{mf})}{\varepsilon_{mf}^3 \phi_s^2} \left( \frac{d_p U_{mf} \rho_g}{\mu} \right) = \frac{d_p^1 \rho_g (\rho_p - \rho_g) g}{\mu^2} \quad \text{[Equation 2]}$$

In the Equation 2, $\epsilon_{mf}$ is the porosity of the particle at the minimum fluidization velocity; $\phi_s$ is the sphericity of the particle; $\rho_g$ is the density (g/cc) of the gas; g is the acceleration of gravity; and $\mu$, $d_p$, $U_{mf}$ and $\rho_p$ are as defined in the Equation 1.

Besides, the terminal velocity of a particle in the gas phase can be determined depending on the velocity of the running gas according to the following Equation 3 (Kunii an Levenspiel correlation, 1969) or the following Equation 4 (Haider and Levenspiel correlation, 1989):

$$U_{t,spherical} = \frac{g(\rho_p - \rho_g)d_p^1}{18\mu} \quad \text{for } Re_p < 5.76 \quad \text{[Equation 3]}$$

$$U_{t,spherical} = \left[\frac{4}{225}\frac{(\rho_p - \rho_g)^2 g^2}{\rho_g \mu}\right]^{1/3} d_p \quad \text{for } 5.76 < Re_p < 540$$

$$U_{t,spherical} = \left[\frac{3.1g(\rho_p - \rho_g)d_p}{\rho_g}\right]^{1/2} \quad \text{for } 540 < Re_p < 200{,}000$$

In the Equation 3, $U_{t,spherical}$ is the terminal velocity of the particle; $Re_p$ is Raynolds number of the particle; and the other reference symbols are as defined in the Equation 2.

$$d_p^* = d_p\left[\frac{\rho_g(\rho_p - \rho_g)g}{\mu^2}\right]^{1/3} = Ar^{1/3} \quad \text{[Equation 4]}$$

$$U_t^* = \left[\frac{18}{(d_p^*)^2} + \frac{2.335 - 1.744\phi_s}{(d_p^*)^{0.5}}\right]^{-1} \quad 0.5 < \phi_s < 1$$

In the Equation 4, $d_p^*$ is the compensated diameter of the particle when the particle is not spherical; $U_t^*$ is the simplified terminal velocity designed for easy calculation of the terminal velocity when the particle is not spherical; and the other reference symbols are as defined in the Equation 2.

If $U_s$ is the velocity of the circulating gas that can be stably used in the gas phase reactor, the stable velocity of the circulating gas in the reaction region A is higher than the minimum fluidization velocity and equal to or less than the double the terminal velocity. In the present invention, for example, the velocity of the circulating gas in the reaction region A is 0.1 m/sec to 1.5 m/sec, preferably 0.2 m/sec to 1.2 m/sec. In this regard, when the velocity of the circulating gas is too low, the polymerization reaction occurs at a velocity below the minimum fluidization velocity while the particle is under insufficient fluidization, so the temperature of the polymer product increases up to the melting temperature or above to cause the sheeting of the product, making it hard to achieve a stable operation of the reactor. When the velocity of the circulating gas is too high, most of the polymer particles circulate into the circulating pipe, the heat exchanger, or the like other than the reaction region A, causing excessive static electricity and hence a caking in the pipe, a plugging in the heat exchanger, etc., with the risk of making it hard to achieve a stable operation of the reactor.

The fluidized bed polymerization reactor capable of using the method of olefin polymerization according to the present invention is designed as illustrated in FIG. 3 in which the conical top section b has an angle of inclination "s" with respect to a perpendicular line (for example, the central line of the reactor 10) in the range of 4° to 7°, preferably 5° to 6°. When the angle of inclination s is less than 4°, the height of the cylinder section is too low and the polymer is positioned relatively too much in the conical top section b, causing a deterioration in the linear velocity of the gas as a function of the height. As the linear velocity of the gas drops, the heat transfer occurs insufficiently and it possibly causes formation of particle agglomerates on the hot spots. When the angle of inclination s is greater than 7°, the height of the fluidized bed is limited to the cylinder section, which may cause an abrupt increase in the linear velocity of the gas, with the risk of causing particle agglomeration such as a sheeting or caking that is common in the fluidized bed reactor. It is therefore necessary to maintain the angle of inclination of the conical top section b in the range of 4° to 7° for the sake of preventing the sheeting or caking phenomenon. The cylindrical base section a and the conical top section b preferably have a circular cross section, but they may have other forms of cross section, such as oval, hexagonal, or the like. In the reactor 10, the ratio of the total height (a+b) of the reactor 10 to the height of the cylindrical base section a is preferably 1:0.20 to 0.85, more preferably 1:0.5 to 0.7. In this regard, there is a risk of causing agglomerates of reactants such as a sheeting or caking when cross-sectional diameter "d" of the cylindrical section a and the ratio of the total height of the reactor 10 to the height of the cylindrical base section a are out of the defined ranges.

Figure 4:
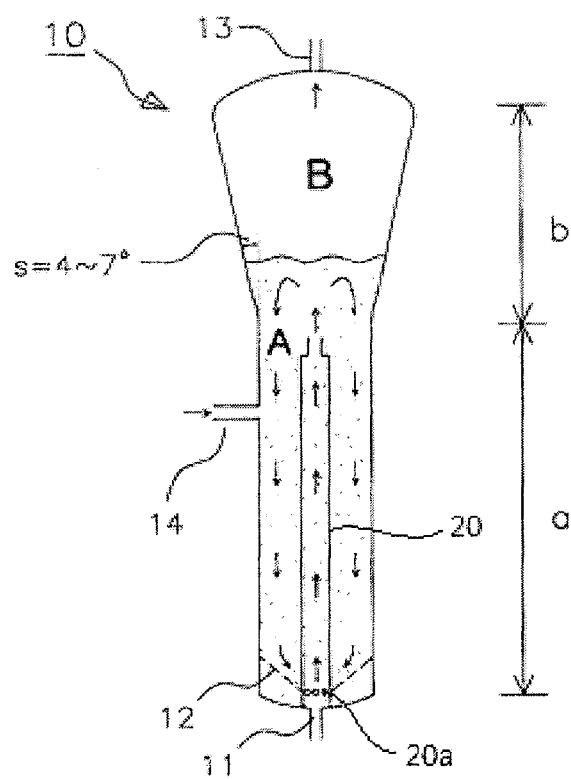
FIG. 4 is a diagram showing another example of the fluidized bed polymerization reactor capable of using the method of olefin polymerization according to the present invention.

FIG. 4 is a diagram showing another example of the fluidized bed polymerization reactor capable of using the method of olefin polymerization according to the present invention. Like the fluidized bed polymerization reactor of FIG. 3, the fluidized bed polymerization reactor 10 of FIG. 4 is an internally circulating fluidized bed polymerization reactor that forcedly circulates the polyolefin particles through a draft tube 20 provided in a fluidized bed A. To the bottom portion of the draft tube 20 is connected a first circulating gas inlet 11 for feeding a circulating gas into the fluidized bed A. A through hole 20a is formed in the bottom portion of the draft tube 20 to let the polyolefin particles get into the draft tube 20. This structure allows the circulating gas and the polyolefin particles to be released from the top of the draft tube 20 to the fluidized bed A. The discharging portion of the draft tube for discharging the circulating gas and the polyolefin particles is preferably positioned at the boundary between the cylindrical base section a and the conical top section b. Accordingly, as indicated by the arrows of FIG. 4, the circulating gas fed through the first circulating gas inlet 11 and the polyolefin particles (polymers) fed through the through hole 20a move upward in the draft tube 20, become released from the top of the draft tube 20 and then go downward in the outside of the draft tube 20, thereby making an internal circulation in the fluidized bed A. In other words, the fluidized bed polymerization reactor 10 is partitioned into two polymerization regions by the draft tube 20. The inside of the draft tube 20 form a riser region in which the growing polyolefin polymers move upward under the fast fluidizing conditions, and the outside of the draft tube 20 forms an annulus region in which the polyolefin polymers after passing through the riser region move downward with gravity. Passing through the annulus region, the polyolefin polymers go back to the bottom portion of the riser region. In this manner, the polyolefin polymers are circulated to undergo the polymerization reaction while moving between the riser and annulus regions. Under necessity, a second circulating gas inlet 21 may be formed in the side wall of the reactor 100 to feed a second circulating gas (i.e., a reactive gas) into the annulus region in the reactor 10. The method of olefin polymerization according to the present invention may be applied to any other type of fluidized bed polymerization reactor such as a reactor equipped with a separate annulus distributor, in addition to the fluidized bed polymerization reactor of FIG. 3 or 4. Specific examples of such polymerization reactors are disclosed in detail in, for example, Patent Registration Nos. 10-0999543 and 10-0981612, which patent documents are included in the present specification as references.

When the draft tube 20 is provided in the fluidized bed A, as shown in FIG. 4, the polyolefin particles and the circulating gas discharged from the draft tube 20 are forced to make an internal circulation in the fluidized bed A formed in the conical top section b, causing a washing of the conical top section b and thereby preventing sheeting or caking of the polyolefin particles. In the reactor 10 of FIG. 4, the particles and the gas discharged from the draft tube 20 interrupt the ascending flow of the circulating gas and break the bubbles of the circulating gas to a smaller size to increase the surface area of the circulating gas, that is, the contact area with the polyolefin particles and thus enhance the yield of the reaction product. In relation to the general fluidized bed reactors, the fluidized bed reactor of FIG. 4 has a high solid/gas ratio at the inlet portion of the draft tube 20 and a low gas content in the discharged polymer particles. This can eliminate the need of having a space for the after-treatment equipment, such as a dryer, degassing equipment, etc., reducing the whole volume of the reactor, and decreasing energy and facility costs. Further, the circulating quantity of the solid can be controlled by regulating the flow rate of the circulating gas fed into the annulus and riser regions, which makes it possible to arbitrarily control the activity of the reactor 10, the product yield, or the like.

According to the present invention, it is possible to suppress the entrainment of polymers, maintain the polymer hold-up of the reactor 10 to a relatively high level with respect to general fluidized bed reactors and scarcely get affected by the length (L)/diameter (D) ratio of the reactor 10, thereby enabling an arbitrary design of the reactor. Further, the flow rate in the draft tube 20 becomes faster when a condensate is added into the reaction region A to operate the reactor in the supercondensed mode (U.S. Pat. No. 5,352,749) or condensed mode (U.S. Pat. No. 4,543,399). It is thus possible to operate the reactor in the supercondensed mode by adding a condensate without any separate equipment.

The method of the present invention may be applied to a polymerization of different polyolefins. Examples of the polymers that can be obtained by the method of the present invention may include: (1) a high density polyethylene (HDPE with a relative density greater than 0.940) comprised of a single polymer of ethylene or a copolymer of alpha-olefin having 3 to 14 carbon atoms and ethylene; (2) a linear low density polyethylene (LLDPE with a relative density less than 0.940) or very low density polyethylene or ultra-low density polyethylene (VLDPE or ULDPE with a relative density of 0.920 to 0.880) comprised of a copolymer of at least one alpha-olefin having 3 to 14 carbon atoms and ethylene; (3) an elastic copolymer of ethylene and propylene or an elastic terpolymer of a trace of diene, propylene and ethylene, containing about 30 to 70 wt. % of monomers derived from ethylene; (4) a crystalline copolymer of propylene and ethylene and/or alpha-olefin containing more than 85 wt. % of monomers derived from propylene, or isotactic polypropylene thereof; (5) a hetero type propylene polymer obtained by a sequential polymerization of ethylene and/or a mixture of other alpha-olefins and propylene, and propylene; (6) an amorphous copolymer of propylene and ethylene, and/or other alpha-olefin containing at least 70 wt. % of monomers derived from propylene, or atactic polypropylene thereof; (7) poly-alpha-olefin (e.g., polypropylene, poly-1-butene, poly-4-methyl-1-pentene, etc.); or (8) polybutadiene or other polydiene rubber. The alpha-olefin and the inert gas as used in the present invention are general materials for use in a polymerization of olefin. The alpha-olefin may be selected from the group consisting of compounds represented by $CH_2=CHR$ (R is hydrogen or a hydrocarbon radical having 1 to 12 carbon atoms), such as ethylene, 1-hexene, etc. The inert gas may be selected from the group consisting of hydrogen and aliphatic hydrocarbons having 2 to 6 carbon atoms. Further, the method of olefin polymerization according to the present invention may use a general metallocene catalyst as a catalyst component.

In addition, a separate olefin polymerization reactor (e.g., a bulk or gas phase, fluidized bed or fixed bed reactor) may be further provided in the upstream or downstream of the reactor 10 using the method of the present invention to perform a polymerization of olefin in a continuous multi-step manner. For example, the method of the present invention may be used in combination with a multi-step method for performing at least two steps of polymerization.

Hereinafter, the present invention will be described in further detail with reference to the specific examples, which are given to exemplify the present invention and not intended to limit the scope of the present invention.

Example 1

Gas Phase Olefin Polymerization

A gas phase polymerization of olefin is carried out in the presence of a dry metallocene supported catalyst of di(n-butyl)cyclopentadienyl zirconium dichloride (di(n-Butyl) $CpZrCl_2$) supported on silica in a fluidized bed reactor as shown in FIG. 4. The fluidized bed consists of polymer granules. Reactants (i.e., ethylene and 1-hexene (comonomers)), hydrogen and ethane (an inert gas) are introduced to the stream of a re-circulating gas on the fluidized bed of the reactor. An anti-static agent (Armostat400) is used to eliminate the static electricity generated during the polymerization process. The individual flow rates of the ethylene, hydrogen and copolymer are controlled so as to maintain a defined composition. The ethylene concentration is controlled to maintain a defined partial pressure of ethylene, and the hydrogen concentration is controlled to maintain a defined molar ratio of hydrogen. All the gas concentrations are measured by the on-line gas chromatography in order to secure a relatively constant composition in the re-circulating gas current. The reaction bed in which the polymer particles are growing is maintained in the fluidized state by feeding the supplement supplies and the continuous flow of the re-circulating gas through the reaction zone. The temperature of the recirculating gas introduced into the reactor is controlled using a gas cooler so as to allow any change in the heat generation caused by the polymerization reaction and maintain a constant temperature of the reactor. The fluidized bed is maintained at a defined height by collecting part of the bed at the same rate of the production rate of the individual micro-particle product. The product is semi-continuously or continuously collected into the chamber of a fixed volume via a series of valves and, at the same time, the reactive gas is discharged. As a result of the polymerization reaction, the catalytic productivity is 8,000 kg/kg-catalyst, and the reactor is operated for consecutive 14 days or more without a cessation of operation caused by polymer agglomerates or fouling. The gas phase polymerization conditions and the results of the reaction are presented in summary in Table 1.

Example 2

Gas Phase Olefin Polymerization

The procedures are performed in the same manner as described in Example 1 to achieve a polymerization of polyolefin, excepting that the conditions for the polymerization reaction are given as shown in Table 1. As a result of the polymerization reaction, the catalytic productivity is 9,000 kg/kg-catalyst, and the reactor is operated for consecutive 14 days or more without a cessation of operation caused by polymer agglomerates or fouling. The gas phase polymerization conditions and the results of the reaction are presented in summary in Table 1.

Comparative Example 1

Gas Phase Olefin Polymerization

The procedures are performed in the same manner as described in Example 1 to achieve a polymerization of polyolefin, excepting that the conditions for the polymerization reaction are given as shown in Table 1. As a result of the polymerization reaction, the catalytic productivity is 9,000 kg/kg-catalyst, and the reactor is operated for consecutive 5 days with a cessation of operation caused by polymer agglomerates due to sheeting.

TABLE 1

| | Example 1 | Example 2 | Comparative Example 1 |
|---|---|---|---|
| Inclined angle "s" of conical top section b | 5° | 5° | 5° |
| Height of fluidized bed A | 20% the height of the conical top section b | 20% the height of the conical top section b | Positioned at the cylindrical base section a |
| Flow velocity of circulating gas (m/s) | 0.92 | 0.90 | 0.92 |
| Reaction temperature (° C.) | 78 | 75 | 76 |
| Ethylene concentration (mol %) | 45 | 42 | 45 |
| Yield (ton/h) | 14 | 15 | 15 |
| Productivity (kg/kg catalyst) | 8,000 | 9,000 | 9,000 |
| Days of operation (days) | 14 days or more | 14 days or more | 5 days |

Example 3

Gas Phase Olefin Polymerization

The procedures are performed in the same manner as described in Example 1 to achieve a polymerization of polyolefin, excepting that the polymerization reaction is performed using a fluidized bed reactor of FIG. 3 under the conditions as given in Table 2. As a result of the polymerization reaction, the catalytic productivity is 5,000 kg/kg-catalyst, and the reactor is operated for consecutive 14 days or more without a cessation of operation caused by polymer agglomerates or fouling.

Comparative Example 2

Gas Phase Olefin Polymerization

The procedures are performed in the same manner as described in Example 1 to achieve a polymerization of polyolefin, excepting that the polymerization reaction is performed using a fluidized bed reactor of FIG. 3 under the conditions as given in Table 2. As a result of the polymerization reaction, the catalytic productivity is 6,000 kg/kg-catalyst, and the reactor is operated for consecutive 7 days with a cessation of operation caused by polymer agglomerates due to chunks.

Comparative Example 3

Gas Phase Olefin Polymerization

The procedures are performed in the same manner as described in Example 1 to achieve a polymerization of polyolefin, excepting that the polymerization reaction is performed using a fluidized bed reactor of FIG. 3 under the conditions as given in Table 2. As a result of the polymerization reaction, the catalytic productivity is 5,500 kg/kg-catalyst, and the reactor is operated for consecutive 8 days with a cessation of operation caused by polymer agglomerates due to sheeting.

TABLE 2

| | Example 3 | Comparative Example 2 | Comparative Example 3 |
|---|---|---|---|
| Inclined angle "s" of conical top section b | 5.5° | 3.0° | 8.0° |
| Height of fluidized bed A | 20% the height of the conical top section b | 20% the height of the conical top section b | 20% the height of the conical top section b |
| Flow velocity of circulating gas (m/s) | 0.90 | 0.92 | 0.92 |
| Reaction temperature (° C.) | 78 | 75 | 75 |
| Ethylene concentration (mol %) | 35 | 35 | 35 |
| Yield (ton/h) | 18 | 15 | 15 |
| Productivity (kg/kg catalyst) | 5,000 | 6,000 | 5,500 |
| Days of operation (days) | 14 days or more | 7 days | 8 days |

What is claimed is:

1. A method of olefin polymerization comprising:
    feeding a circulating gas including at least one alpha-olefin and an inert gas into a reactor;
    polymerizing the alpha-olefin into a polyolefin in a reaction region in the reactor;
    and discharging the polyolefin from the reactor,
    wherein the reactor comprises a cylindrical base section a positioned in the lower part thereof and a conical top section b positioned on the top of the cylindrical base section and having an open top and a boundary between the cylindrical base section a and the conical top section b,
    wherein the conical top section b has an angle of inclination in the range of 4° to 7° with respect to a perpendicular line,
    wherein the inside of the reactor is divided into a reaction region A that is a fluidized bed region having an olefin polymerization occurring therein, and a free region B positioned on the top of the reaction region A and having solid polyolefin particles separated from the gas phase,
    wherein the fluidized bed A is at least as high as the cylindrical base section a and 80 percent or less the height of the conical top section b;
    wherein a draft tube is provided in the fluidized bed A, so the circulating gas and polyolefin particles are discharged from the top of the draft tube to the fluidized bed A from a discharging portion of the draft tube positioned at the boundary between the cylindrical base section a and the conical top section b.

2. The method of olefin polymerization as claimed in claim 1, wherein the fluidized bed is 5 to 50 percent the height of the conical top section b.

3. The method of olefin polymerization as claimed in claim 1, wherein the conical top section b has an angle of inclination in the range of 5° to 6°, and the fluidized bed is 10 to 30 percent the height of the conical top section b.

4. The method of olefin polymerization as claimed in claim 1, wherein the ratio of the total height of the reactor (a+b) to the height of the cylindrical base section a is in the range of 1:0.2 to 0.85.

5. The method of olefin polymerization as claimed in claim 1, wherein the velocity of the circulating gas in the reaction region A is 0.1 m/sec to 1.5 m/sec.

6. The method of olefin polymerization as claimed in claim 1, wherein a condensate is fed into the reaction region A to operate the reactor in a supercondensed or condensed mode.

7. The method of olefin polymerization as claimed in claim 1, wherein a separate olefin polymerization reactor is further provided in the upstream or downstream of the reactor to perform a polymerization of olefin in a continuous multi-step manner.

* * * * *